(12) United States Patent
Mitchell

(10) Patent No.: US 8,584,947 B2
(45) Date of Patent: Nov. 19, 2013

(54) FRAUD PREVENTION

(75) Inventor: Graeme Mitchell, Dundee (GB)

(73) Assignee: NCR Corporation, Duluth, GA (US)

( * ) Notice: Subject to any disclaimer, the term of this patent is extended or adjusted under 35 U.S.C. 154(b) by 101 days.

(21) Appl. No.: 13/230,976

(22) Filed: Sep. 13, 2011

(65) Prior Publication Data

US 2013/0062410 A1  Mar. 14, 2013

(51) Int. Cl.
- *G06K 7/08* (2006.01)
- *G06K 5/00* (2006.01)
- *G06K 19/00* (2006.01)
- *G06K 19/06* (2006.01)
- *G07F 19/00* (2006.01)
- *G07D 11/00* (2006.01)
- *G06Q 40/00* (2012.01)
- *G06F 17/00* (2006.01)

(52) U.S. Cl.
USPC ........... 235/449; 235/487; 235/492; 235/375; 235/379; 235/380

(58) Field of Classification Search
USPC .................. 235/449, 487, 492, 375, 379, 380
See application file for complete search history.

(56) References Cited

U.S. PATENT DOCUMENTS

| | | | | |
|---|---|---|---|---|
| 6,422,475 B1 * | 7/2002 | May | ............................. | 235/492 |
| 6,478,221 B1 * | 11/2002 | Sommerville | ................ | 235/379 |
| 6,494,364 B2 * | 12/2002 | Shepherd | ....................... | 235/379 |
| 6,629,643 B1 * | 10/2003 | Nagata et al. | .................. | 235/475 |
| 7,100,829 B2 * | 9/2006 | Okada | ........................... | 235/439 |
| 7,151,451 B2 * | 12/2006 | Meskens et al. | .............. | 340/552 |
| 7,281,656 B2 * | 10/2007 | Nagata et al. | ................. | 235/449 |
| 7,377,434 B2 * | 5/2008 | Wakabayashi | ................ | 235/449 |
| 7,721,963 B2 * | 5/2010 | Schliebe et al. | .............. | 235/450 |
| 8,028,899 B2 * | 10/2011 | Ramachandran et al. | ..... | 235/379 |
| 8,055,184 B1 * | 11/2011 | Dimartino et al. | ................. | 455/1 |
| 8,244,169 B1 * | 8/2012 | Dimartino et al. | ................. | 455/1 |
| 8,397,991 B2 * | 3/2013 | Mueller | ........................ | 235/450 |
| 2001/0038036 A1 * | 11/2001 | May | ............................. | 235/449 |
| 2003/0017312 A1 * | 1/2003 | Labrousse et al. | ............. | 428/195 |
| 2004/0026507 A1 * | 2/2004 | Nagata et al. | .................. | 235/449 |
| 2004/0035929 A1 * | 2/2004 | Okada | ........................... | 235/438 |
| 2004/0094628 A1 * | 5/2004 | Yoshii | ............................ | 235/475 |
| 2007/0057070 A1 * | 3/2007 | Scarafile et al. | .............. | 235/475 |
| 2007/0131768 A1 * | 6/2007 | Wakabayashi | ................ | 235/449 |
| 2007/0138256 A1 * | 6/2007 | Coventry | ....................... | 235/379 |
| 2007/0175983 A1 * | 8/2007 | Klug | ............................. | 235/380 |
| 2009/0050699 A1 * | 2/2009 | Basar et al. | .................... | 235/436 |
| 2009/0064340 A1 * | 3/2009 | Ho et al. | ........................... | 726/26 |
| 2009/0159676 A1 * | 6/2009 | Schliebe et al. | .............. | 235/436 |
| 2010/0176191 A1 * | 7/2010 | Ramachandran et al. | ..... | 235/379 |
| 2011/0006112 A1 * | 1/2011 | Mueller | ......................... | 235/379 |
| 2011/0135092 A1 * | 6/2011 | Lehner | .......................... | 380/252 |
| 2012/0002313 A1 * | 1/2012 | Miyabe et al. | ..................... | 360/2 |
| 2012/0043380 A1 * | 2/2012 | Schliebe et al. | .............. | 235/379 |
| 2012/0104090 A1 * | 5/2012 | Gross | ............................. | 235/379 |
| 2012/0280033 A1 * | 11/2012 | Mitchell et al. | ............... | 235/379 |
| 2012/0280041 A1 * | 11/2012 | Ross et al. | ..................... | 235/439 |
| 2013/0161388 A1 * | 6/2013 | Mitchell | ....................... | 235/436 |

* cited by examiner

Primary Examiner — Daniel Walsh
(74) Attorney, Agent, or Firm — Peter H. Priest

(57) ABSTRACT

A method of protecting a magnetic card inserted into a card reader in a self-service terminal is described. The method comprises detecting presentation of a card at a card reader; energizing an electromagnetic signal transmitter in response to detecting presentation of the card; detecting a change of state of a width switch; de-energizing the electromagnetic signal transmitter in response to detecting the change of state of the width switch; detecting a magnetic signal from a pre-read magnetic reader; and re-energizing an electromagnetic signal transmitter in response to detecting the magnetic signal from the pre-read magnetic reader.

20 Claims, 10 Drawing Sheets

| WIDTH SWITCH STATUS | SHUTTER STATUS | PROXIMITY DETECTOR STATUS | JAM SIGNAL STATUS |
|---|---|---|---|
| OPEN | CLOSED | ON | ON (ACTIVE) |
| CLOSED | CLOSED | ON | OFF (INACTIVE) |
| CLOSED | OPEN | ON | ON (ACTIVE) |
| OPEN | CLOSED | ON | OFF (INACTIVE) |
| OPEN | CLOSED | OFF | OFF (INACTIVE) |
| OPEN | OPEN | ON | ON (ACTIVE) |
| OPEN | OPEN | OFF | ON (ACTIVE) |
| CLOSED | OPEN | ON | ON (ACTIVE) |
| OPEN | CLOSED | ON | ON (ACTIVE) |
| OPEN | CLOSED | OFF | OFF (INACTIVE) |

FIG. 1
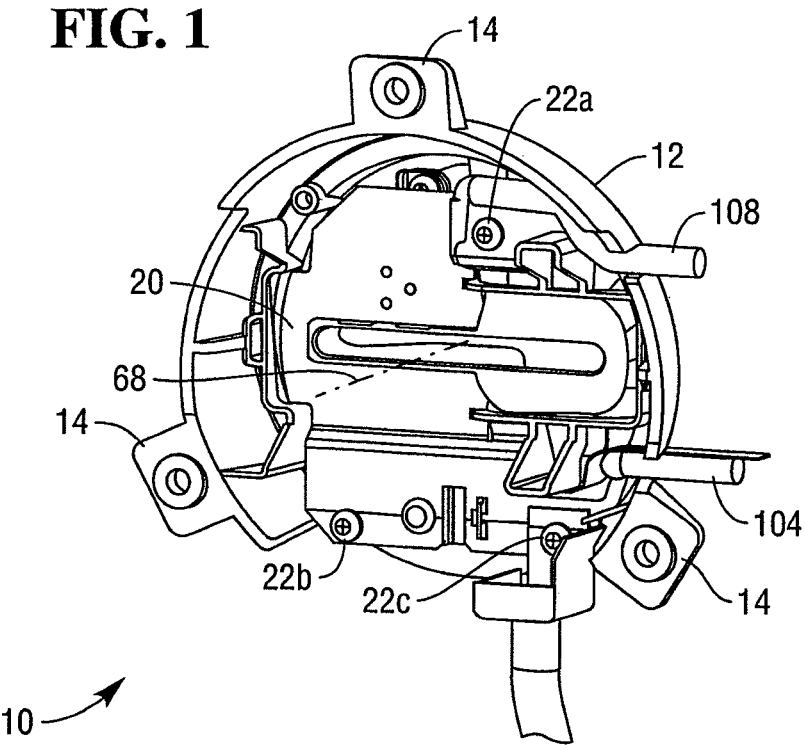
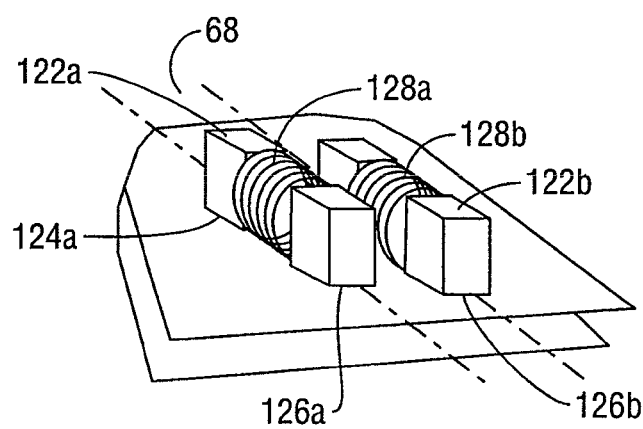
FIG. 8

| WIDTH SWITCH STATUS | SHUTTER STATUS | PROXIMITY DETECTOR STATUS | JAM SIGNAL STATUS |
| --- | --- | --- | --- |
| OPEN | CLOSED | ON | ON (ACTIVE) |
| CLOSED | CLOSED | ON | OFF (INACTIVE) |
| CLOSED | OPEN | ON | ON (ACTIVE) |
| OPEN | CLOSED | ON | OFF (INACTIVE) |
| OPEN | CLOSED | OFF | OFF (INACTIVE) |
| OPEN | OPEN | ON | ON (ACTIVE) |
| OPEN | OPEN | OFF | ON (ACTIVE) |
| CLOSED | OPEN | ON | ON (ACTIVE) |
| OPEN | CLOSED | ON | ON (ACTIVE) |
| OPEN | CLOSED | OFF | OFF (INACTIVE) |

FIG. 11

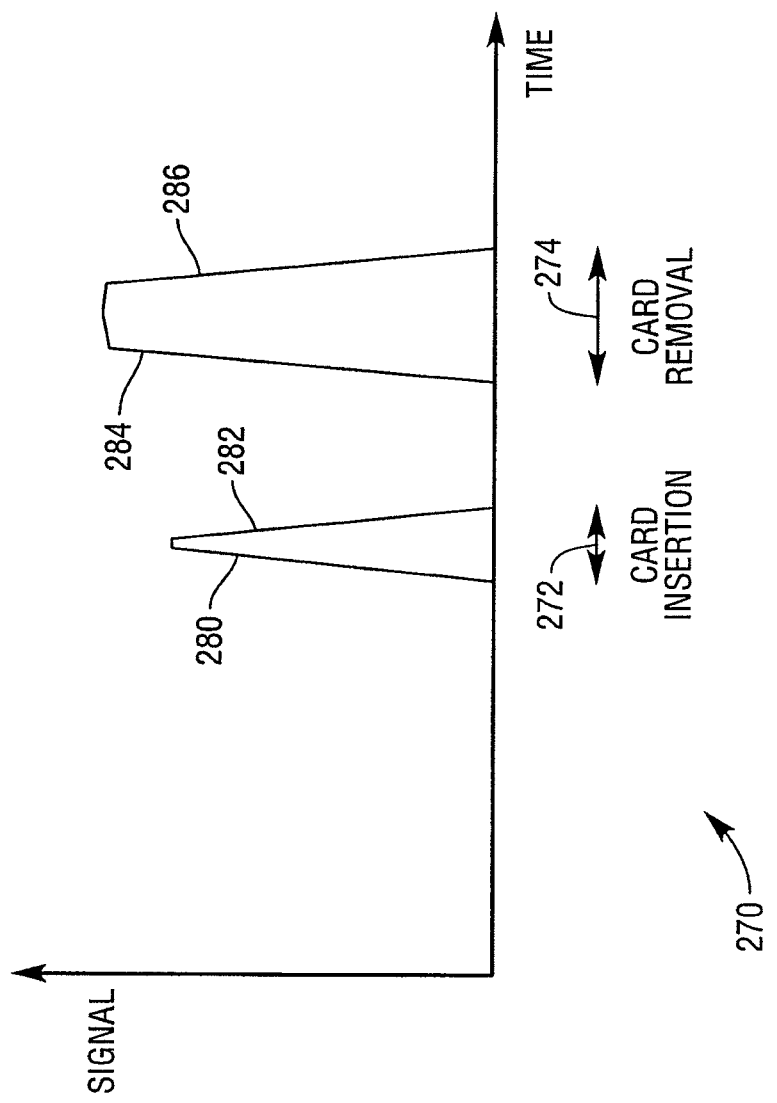

FRAUD PREVENTION

FIELD OF INVENTION

The present invention relates to fraud prevention. In particular, although not exclusively, the invention relates to preventing unauthorized reading of data from a card.

BACKGROUND OF INVENTION

Unauthorized reading of card data, such as data encoded on a magnetic stripe card, while the card is being used (hereafter "card skimming"), is a known type of fraud. Card skimming is typically perpetrated by a fraudster adding a magnetic read head (hereafter "alien reader") to a fascia of an automated teller machine (ATM) to read a magnetic stripe on a customer's card as the customer inserts or (more commonly) retrieves the card from an ATM. The customer's personal identification number (PIN) is also ascertained by the fraudster when the customer uses the ATM. Examples of how the fraudster ascertains the PIN include: a video camera that captures images of the PINpad on the ATM, a false PINpad overlay that captures the customer's PIN, or the fraudster watching the customer ("shoulder surfing") as he/she enters his/her PIN. The fraudster can then create a card using the card data read by the alien reader, and can withdraw funds from the customer's account using the created card and the customer's PIN (ascertained by one of the ways described above).

Various methods have been proposed to defeat this type of fraud. One method involves transmitting an electromagnetic signal (hereafter a "jamming signal") when the card is being transported so that the alien reader cannot detect the magnetically encoded data because of the presence of the jamming signal. Although this technique can be effective, it has some disadvantages.

Card readers typically include a pre-read head that is used to ensure that the customer's card is correctly oriented on insertion. If the pre-read head detects a magnetic stripe, and a width switch detects that the inserted card is the correct width, then a shutter is opened to allow the inserted card to enter into an enclosed card reading chamber. One problem with using a jamming signal is that the jamming signal can overpower (or swamp) the pre-read head so that the pre-read head cannot detect any magnetic stripe. This means that the shutter will not be opened.

One option would be to turn on the jamming signal only after the pre-read head has detected a magnetic stripe. The disadvantage with this approach is that an alien reader may already have read the magnetic stripe by the time the jamming signal has been turned on.

It would be advantageous to be able to use the pre-read head to detect correct orientation of a card, without increasing the risk of skimming of the magnetic data from the inserted card.

SUMMARY OF INVENTION

Accordingly, the invention generally provides methods, systems, apparatus, and software for providing improved fraud prevention.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of protecting a magnetic card inserted into a card reader in a self-service terminal, the method comprising:

detecting presentation of a card at a card reader;

energizing an electromagnetic signal transmitter in response to detecting presentation of the card;

detecting a change of state of a width switch;

de-energizing the electromagnetic signal transmitter in response to detecting the change of state of the width switch;

detecting a magnetic signal from a pre-read magnetic reader; and re-energizing an electromagnetic signal transmitter in response to detecting the magnetic signal from the pre-read magnetic reader.

The method may comprise the further step of: opening a shutter, in response to the pre-read magnetic reader detecting a signal, to allow the card to be transported to a card reading chamber.

The method may comprise the further steps of: closing the shutter when the card is within the card reading chamber; and de-energizing the electromagnetic signal transmitter.

The step of detecting presentation of a card at a card reader may include detecting a customer's hand while the card is presented.

The step of detecting presentation of a card at a card reader may be implemented using a proximity sensor. The proximity sensor may comprise a capacitive sensor, an inductive sensor, or an optical sensor.

The capacitive sensor may comprise a transmit plate spatially separated from a receive plate by a ground strip. The capacitive sensor may receive an alternating voltage on the transmit plate.

The capacitive sensor and the electromagnetic signal transmitter may both be integrated into a card guide mounted on a fascia of the self-service terminal.

According to a second aspect there is provided a self-service terminal (SST) comprising:

a card reader including a width switch operable to change state when a card is inserted by a customer and a pre-read head operable to detect a magnetic stripe on the card;

a proximity sensor operable to detect a card while the card is presented by the customer;

an electromagnetic signal transmitter operable to create a signal for jamming a magnetic reading head; and a control program operable to (i) detect a change in state of the width switch, (ii) de-energize the electromagnetic signal transmitter in response to the change in state of the width switch, (iii) open a shutter in response to the pre-read head detecting the magnetic stripe, and (iv) energize the electromagnetic signal transmitter in response to the pre-read head detecting the magnetic stripe.

The proximity sensor may be located within a card reader guide. The card reader guide may be removably coupled to an SST fascia.

The proximity sensor may be operable to detect both the customer and any alien reader attached to the self-service terminal to read the customer's card.

In other words, the same sensor may be used to perform two functions: (i) detecting the customer (or a card presented by the customer), and (ii) detecting any alien reader attached to the SST.

The self-service terminal may be an automated teller machine (ATM), an information kiosk, a financial services centre, a bill payment kiosk, a lottery kiosk, a postal services machine, a check-in and/or check-out terminal such as those used in the retail, hotel, car rental, gaming, healthcare, and airline industries, and the like.

According to a third aspect there is provided a self-service terminal operable to energize an electromagnetic signal transmitter when a data card approaches the terminal; de-energize the electromagnetic signal transmitter in response to a change in state of a contact sensor; and to re-energize the electromagnetic signal transmitter thereafter.

The electromagnetic signal may be re-energized in response to a change in state of a component in the SST, such as a shutter.

Alternatively, the electromagnetic signal may be re-energized in response to activation of a transport for moving the data card.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

BRIEF DESCRIPTION OF THE DRAWINGS

FIG. 1 is a pictorial diagram of a rear perspective view of a card reader guide for use in a self-service terminal (SST) according to one embodiment of the present invention;

FIG. 8 is a pictorial perspective view of the signal generator of FIG. 7;

FIG. 11 is a table illustrating combinations of inputs to the detector controller of FIG. 10 that activate the signal generator;

FIG. 12 is a graph illustrating a signal from the magnetic reader detector of FIG. 5 while a customer's hand is present in the vicinity of the card reader guide of FIG. 1 to insert and then remove a card.

Figure 2:
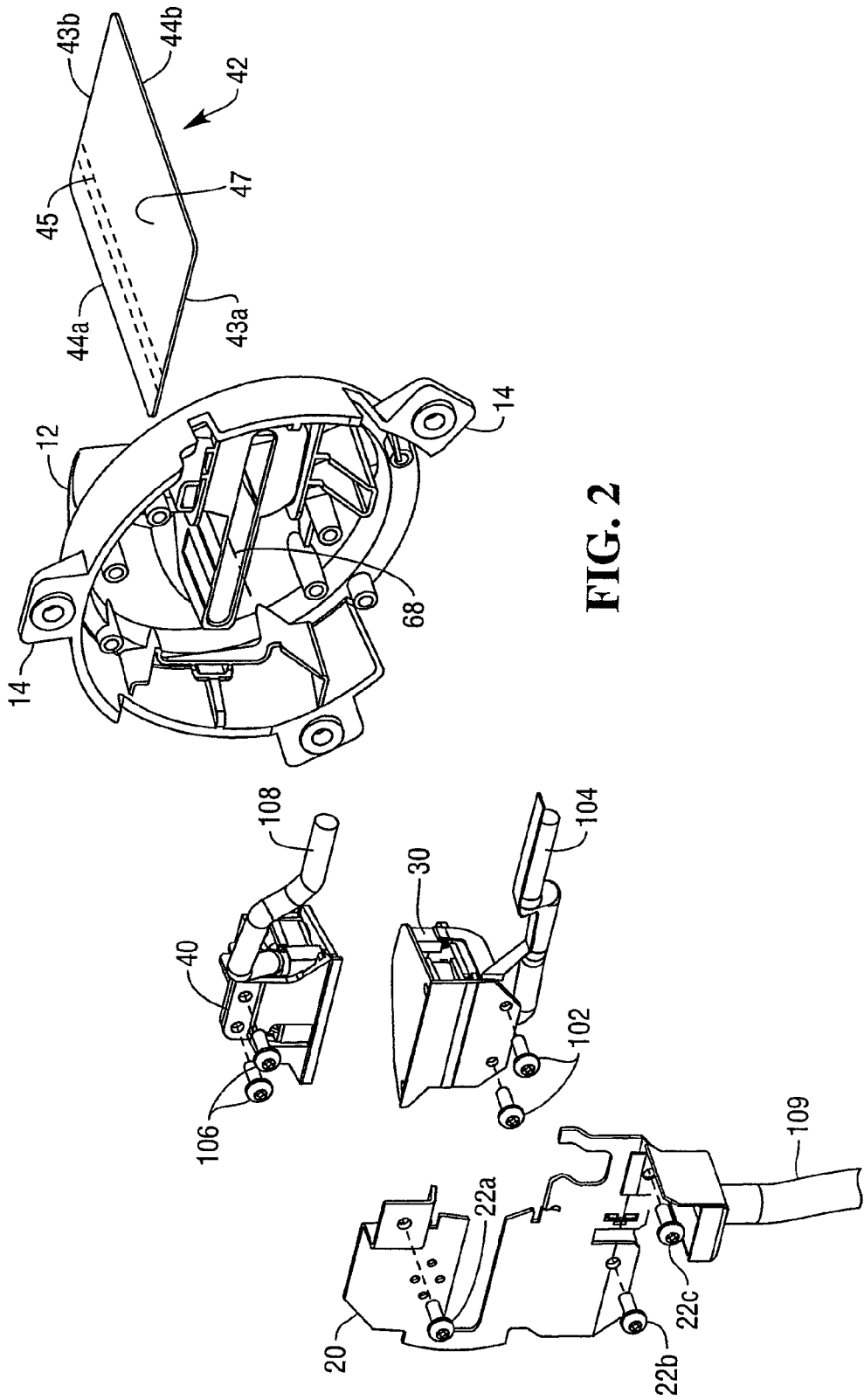
FIG. 2 is an exploded pictorial diagram illustrating components of the card reader guide of FIG. 1.

It should be appreciated that some of the drawings provided are based on computer renderings from which actual physical embodiments can be produced. As such, some of these drawings contain details that are not essential for an understanding of these embodiments but will convey useful information to one of skill in the art. Therefore, not all parts shown in the drawings will be referenced specifically. Furthermore, to aid clarity and to avoid numerous leader lines from cluttering the drawings, not all reference numerals will be shown in all of the drawings. In addition, some of the features may have been removed from some views to further aid clarity.

DETAILED DESCRIPTION

Reference is first made to FIG. 1, which is a pictorial diagram of a rear perspective view of a card reader guide 10. The card reader guide 10 comprises a card reader guide cover 12 defining three apertured tabs 14 by which the card reader guide cover 12 is coupled to a rear part of a fascia (not shown in FIG. 1) of an SST according to one embodiment of the present invention.

The card reader guide 10 further comprises a shielding plate 20 coupled to the card reader guide cover 12 by three screws 22a,b,c.

Reference is now also made to FIG. 2, which is an exploded pictorial diagram illustrating components of the card reader guide 10. FIG. 2 illustrates a proximity detector 30 in the form of a magnetic reader detector and a signal generator 40 for creating a jamming signal. FIG. 2 also shows a data card 42 (in the form of a magnetic stripe card) aligned with the card reader guide 10.

The card reader guide 10 is operable to receive the magnetic stripe card 42, which is inserted by a customer. A magnetic stripe card has a large planar area (the length and width) on each of two opposing sides and a four thin edges therebetween. Two of these edges (front and rear) 43a,b are narrower than the other two edges (the side edges) 44a,b. The magnetic stripe side (the lower side) of a card refers to the large planar area that carries a magnetic stripe 45 (shown in broken line in FIG. 2). The magnetic stripe 45 is disposed parallel to the side edges 44a,b.

Opposite the magnetic stripe side (the upper side 47) there is a large planar area that (typically) does not carry a magnetic stripe 45, but typically includes account and customer information embossed thereon. On some cards, the upper side 47 may carry integrated circuit contacts. On the magnetic stripe side of the card, the magnetic stripe 45 is not centrally located; rather, it is located nearer to one of the side edges (referred to as the magnetic stripe edge 44a) than to the other side edge (referred to as the non-magnetic stripe edge 44b).

Figure 3:
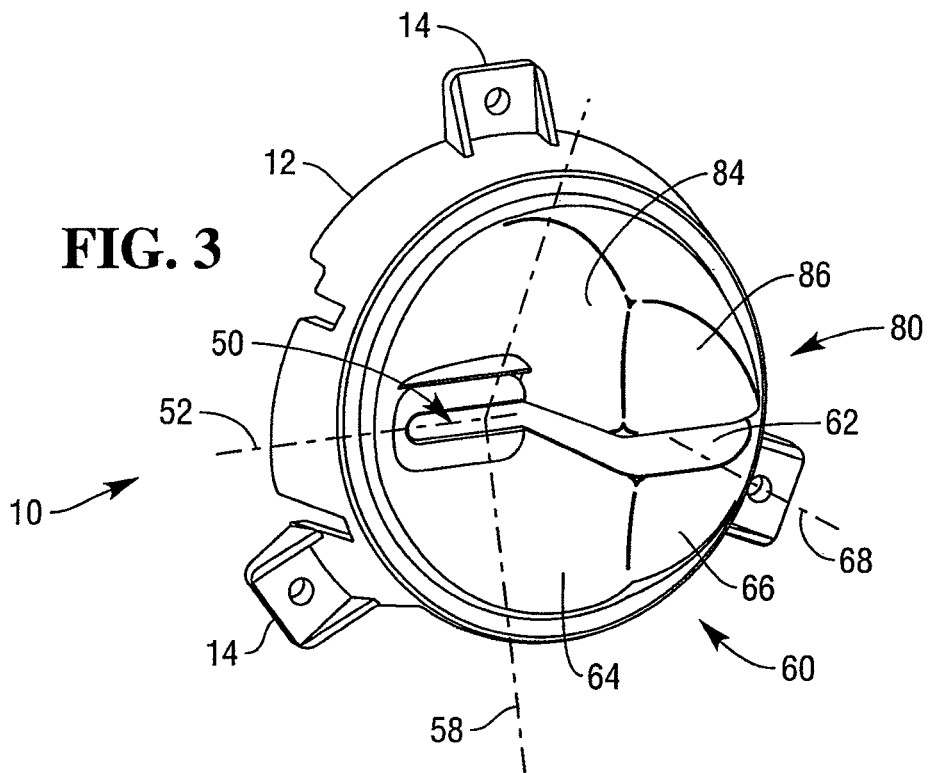
FIG. 3 is a front perspective view of one part (the card reader guide cover) of the card reader guide of FIG. 1.
Figure 4:
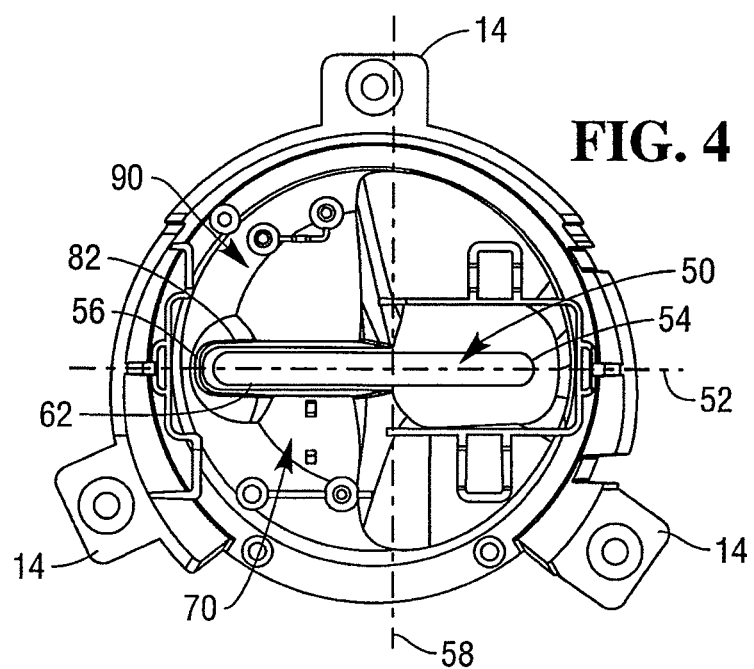
FIG. 4 is a rear perspective view of the card reader guide cover of FIG. 3.

Reference will now also be made to FIGS. 3 and 4, which are front and rear perspective views, respectively, of the card reader guide 10.

The card reader guide cover 12 comprises a moulded plastics part dimensioned to be accommodated within, and partially protrude through, an aperture in a fascia (not shown) of an SST.

The card reader guide 10 defines a card slot 50 extending generally horizontally across the guide 10 in the direction of centre line 52, from a non-stripe end 54 to a stripe end 56.

When the magnetic stripe card 42 is correctly inserted into the card slot 50 by a customer then the magnetic stripe 45 on the magnetic stripe card 42 is located closer to the stripe end 56 than to the non-stripe end 54.

The card reader guide 10 defines a breakout line 58 extending generally vertically (perpendicular to the card reader slot 50). The card reader guide 10 also defines a first (lower) protrusion 60.

The first (lower) protrusion 60 includes a planar section 62 across which the magnetic stripe side of a card passes as the card 42 is inserted. The first (lower) protrusion 60 also includes an upright section 64 that extends from the breakout line 58 to an end surface 66. The end surface 66 is spaced from the card slot 50 to ensure that card does not protrude beyond the end surface 66 when ejected by a card reader (not shown) within the SST.

A magnetic stripe path 68 is defined on the planar section 62. This is the portion of the planar section 62 that the magnetic stripe 45 on a correctly inserted data card 42 will be in registration with when the card 42 is inserted or removed by a customer. In this embodiment, the magnetic stripe path 68 is centered on track two of a magnetic stripe. It is track two that carries the customer account information for the data card 42, so track two is the track that alien readers attempt to read.

The first protrusion 60 also defines a cavity (best seen in FIG. 4 and shown generally by arrow 70), which is referred to herein as the "detector cavity", and which is beneath the planar section 62 and within the card reader guide cover 12.

The card reader guide 10 defines a second (upper) protrusion 80 similar to, aligned with, and opposite the first protrusion 60.

The second (upper) protrusion 80 includes a planar section 82 (best seen in FIG. 4) beneath which a magnetic stripe side of a card 42 passes as the card 42 is inserted. The second (upper) protrusion 80 also includes an upright section 84 that extends from the breakout line 58 to an end surface 86. The second protrusion 80 defines a cavity 90 (referred to herein as the "signal generator cavity") above the planar section 82 and within the card reader guide cover 12.

Referring again to FIG. 2, the magnetic reader detector 30 is dimensioned to be accommodated within the detector cavity 70 and is mounted therein by two screws 102 that engage with the card reader guide 10. The magnetic reader detector 30 includes a communication cable 104 for routing signals and power between the magnetic reader detector 30 and an external controller (not shown in FIG. 2). Such a controller would typically be located in an SST in which the card reader guide 10 is installed.

Similarly, the signal generator 40 is dimensioned to be accommodated within the signal generator cavity 90 and is mounted therein by two screws 106 that engage with the card reader guide 10. The signal generator 40 also includes an output cable 108 for routing signals and power between the signal generator 40 and the external controller (not shown in FIG. 2).

A drainage pipe 109 is also provided to drain away any water ingress from the card slot 50.

Figure 5:
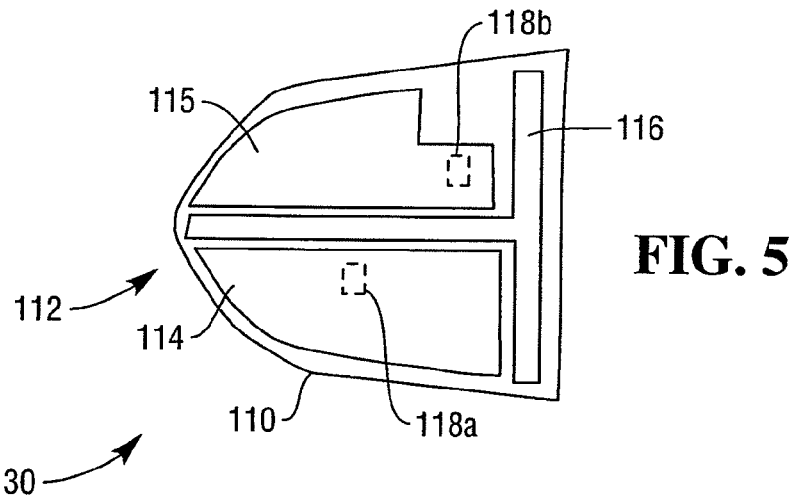
FIG. 5 is a pictorial plan view of part (the magnetic reader detector) of one of the components of the card reader guide shown in FIG. 2.

Reference will now be made to FIG. 5, which is a pictorial plan view of part of the magnetic reader detector 30. The magnetic reader detector 30 comprises a track printed circuit board (pcb) 110 on which is disposed part of a capacitive sensor 112 and an electronic drive circuit (not shown) located beneath the track pcb 110.

The magnetic reader detector 30 is physically configured to conform to the shape of the detector cavity 70 so that when the magnetic reader detector 30 is inserted into the detector cavity 70 the track pcb 110 fits securely in place.

The capacitive sensor 112 operates in a similar way to a capacitive proximity sensor, as will now be described. The capacitive sensor 112 comprises a transmit plate 114 separated from a receive plate 115 by a linear track (a ground strip) 116. The transmit plate 114, receive plate 115, and ground strip 116 are all defined as conducting tracks on the track pcb 110.

The ground strip 116 is located on the track pcb 110 such that when the magnetic reader detector 30 is inserted into the lower protrusion 60 of the card reader guide 10, the ground strip 116 is in registration with the magnetic stripe path 68. In particular, the ground strip 116 is aligned with track two of the magnetic stripe path 68. This is illustrated in FIG. 6, which is a pictorial perspective view of the card reader guide 10, with the card reader guide cover 12 shown as partially transparent to reveal the magnetic reader detector 30.

The capacitive sensor 112 operates by transmitting an alternating signal on the transmit plate 114, which creates an electric field between the transmit plate 114 and the receive plate 115 that arches over the ground strip 116, the air gap in the arch providing the dielectric. If a material (such as an alien reader, or a data card) is inserted into this electric field then the dielectric changes, which changes the phase and magnitude of the electric field. This is detected by the receive plate 115.

Figure 6:
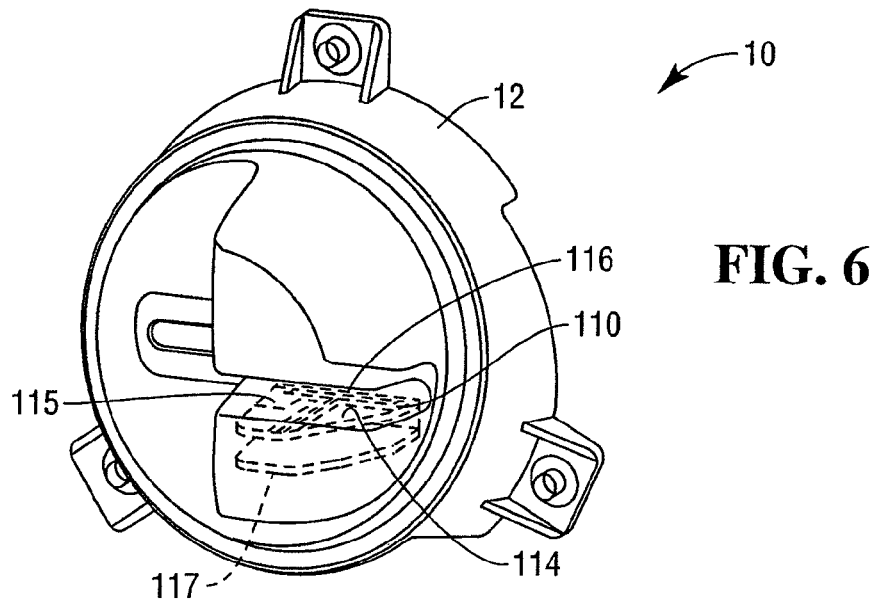
FIG. 6 is a pictorial perspective view of the card reader guide of FIG. 1, with the card reader guide cover of FIG. 3 shown as partially transparent to reveal the magnetic reader detector of FIG. 5 located therein.

Drive and signal processing circuitry (not shown) is located on a drive pcb 117 (located beneath the track pcb 110, as shown in FIG. 6) to provide the alternating signal and detect the phase and magnitude changes.

The geometry, configuration, and location of the transmit plate 114, receive plate 115, and ground strip 116 optimizes the probability of the capacitive sensor 112 detecting an alien reader, because any alien reader must be located at a point over which track two of the card's magnetic stripe will pass, and the electric field is located along this path.

The track pcb 110 also includes two magnetic sensors 118a,b mounted on an underside thereof.

The communication cable 104 conveys one signal from each of the two magnetic sensors 118, power to supply the capacitive sensor 112, and one response signal from the capacitive sensor 112.

Figure 7:
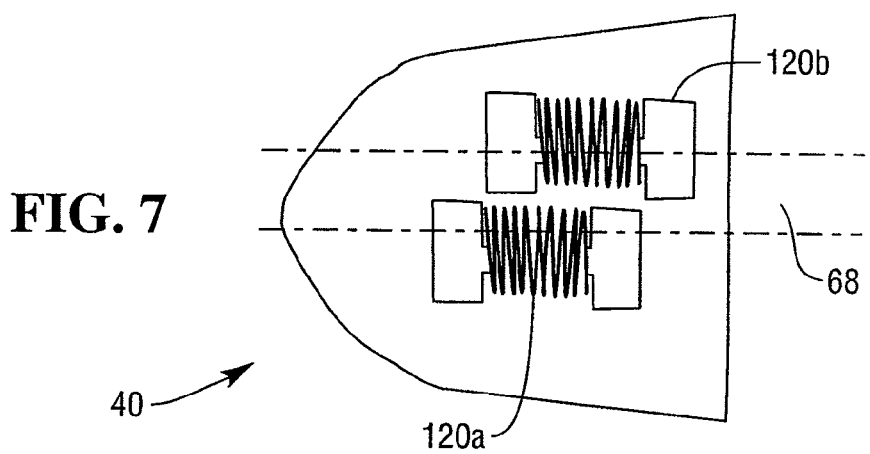
FIG. 7 is a pictorial plan view of another part (the signal generator) of one of the components of the card reader guide shown in FIG. 2.

Reference will now be made to FIGS. 7 and 8, which are a pictorial plan view and perspective view respectively, of part of the signal generator 40 shown relative to the magnetic stripe path 68.

The signal generator (also referred to as an electromagnetic signal transmitter) 40 comprises a pair of inductive coil drives 120a,b. Each inductive drive coil 120a,b comprises a generally C-shaped (when viewed from the side) ferrite core 122a,b having opposing poles (north pole 124a,b (only 124a is shown) and south pole 126a,b) at opposite ends, and being wound with wire 128a,b at a central portion. Each inductive coil drive 120a,b is driven by a signal from the external controller (not shown). The C-shape of the ferrite cores ensures that most of the electromagnetic field generated by the inductive coil drives 120a,b extends downwards towards the magnetic stripe path 68, rather than upwards.

Each of the inductive coil drives 120a,b straddles the magnetic stripe path 68 but the two inductive coil drives are longitudinally offset relative to each other (as shown in FIG. 7). Thus, the two inductive coils 120a,b do not generate a symmetric electromagnetic field. This longitudinal offsetting makes it more difficult for a fraudster to filter out the combined signal from the two inductive coil drives 120a,b.

One of the two magnetic sensors 118a,b is in registration with a centre point between the poles 124a,126a of the first ferrite core 122a, the other of the two magnetic sensors 118b is in registration with a centre point between the poles of the second ferrite core 122b. Each of the two magnetic sensors 118a,b measures the magnetic signal present. If the two inductive coils 120a,b are active then a large magnetic signal should be detected by each of the two magnetic sensors 118a,b.

Figure 9:
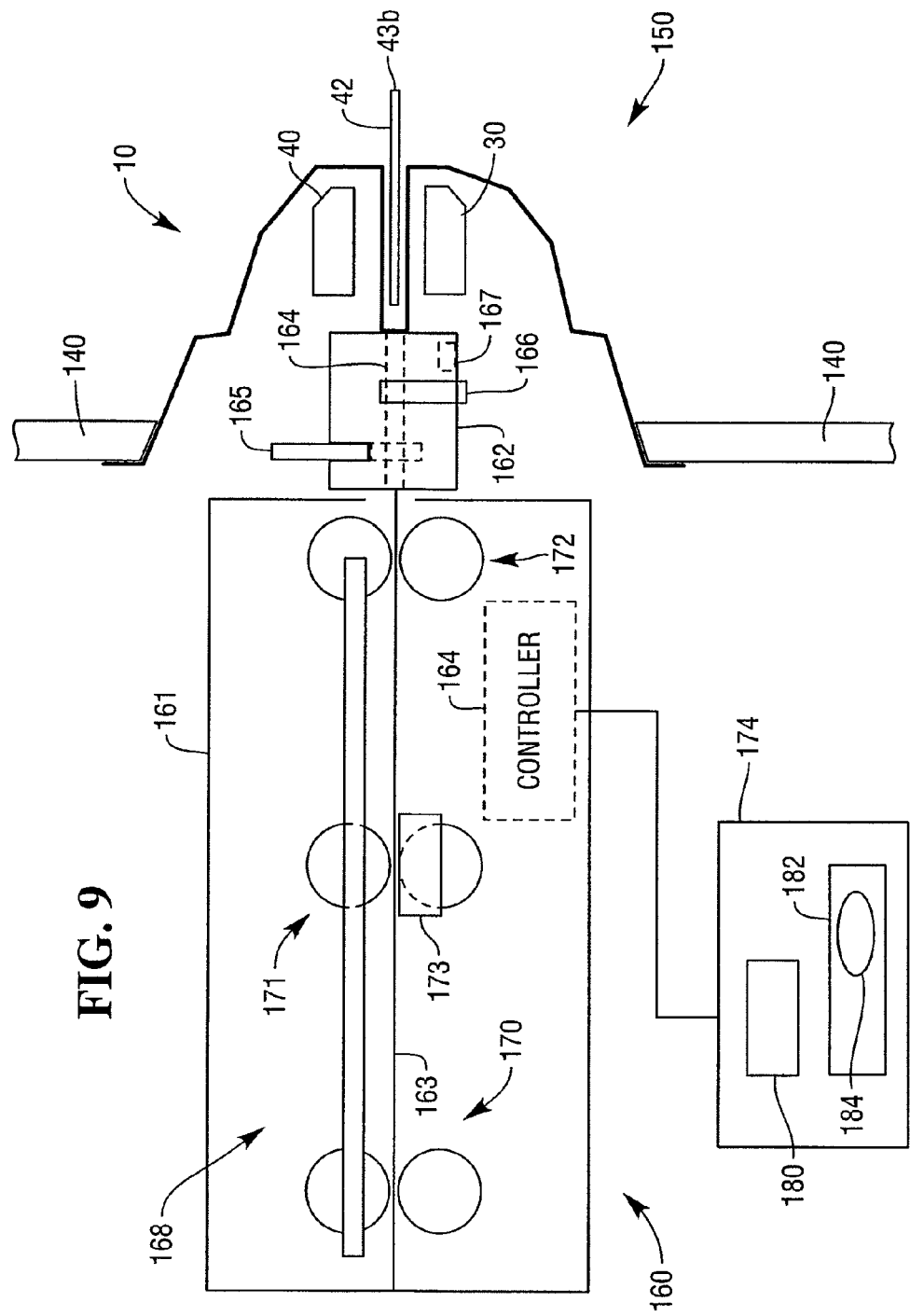
FIG. 9 is a simplified sectional side view of part of an SST illustrating the card reader guide of FIG. 1 aligned with a card reader.

Reference will now also be made to FIG. 9, which is a schematic side view of a fascia 140 of an SST 150 that includes the card reader guide 10 aligned with a motorized card reader 160, and shows the data card 42 partially inserted into the card reader guide 10.

The motorized card reader 160 is aligned with, and located behind, the card reader guide 10. In this embodiment the motorized card reader 160 is from Sankyo Seiki Mfg Ltd at 1-17-2, Shinbashi, Minato-Ku, Tokyo, 1058633, Japan. However, any other suitable motorized card reader could be used.

The card reader 160 comprises a card enclosure 161 (also referred to as a card reading chamber) coupled to a card entrance 162 (in the form of a throat portion).

The card reader 160 is aligned with the card reader guide 10 so that a card transport path 163 in the card reader 160 aligns with the card slot 50 of the card reader guide 10.

The card reader throat portion 162 defines a slot 164 dimensioned for receiving the data card 42, which is correctly inserted when the front edge 43a is leading and the magnetic stripe side is face down.

The card reader throat portion 162 also includes a shutter 165 pivotally coupled to the card enclosure 161 for controlling access from the throat portion 162 to the card enclosure 161.

When the shutter 165 is in the open position, a card (such as data card 42) may be transported from the throat portion 162 to the card enclosure 161; whereas, with the shutter 165 in the closed position no card may pass between the throat portion 162 and the card enclosure 161.

Once the front edge 43a of the data card 42 passes the shutter 165, the shutter 165 is released and biased against the top of the data card 42 so that the shutter 165 automatically closes once the trailing (or rear) edge 43b of the data card 42 clears the shutter 165.

The throat portion 162 includes two sensors for verifying that an object inserted by the customer is actually an ATM card or credit card. The shutter 165 is only opened if the correct signals are received from both sensors.

The first sensor 166 is a card width detection sensor (also referred to as a width switch). This width switch 166 is physically deflected by the data card 42 on insertion and ejection of the data card 42. If a customer inserts a correctly-dimensioned card into the throat portion 162 then the width switch 166 detects the presence of this card.

The second sensor 167 is a pre-shutter read head (also referred to as a pre-read head). This pre-read head 167 is located at a point in the card entrance 162 over which the magnetic stripe 45 of the data card 42 should pass. The width switch 166 verifies that the data card 42 has the correct width, the pre-read head 167 verifies that the data card 42 is correctly oriented. If both sensors 166,167 respond correctly to an inserted object (such as data card 42) then the shutter 165 is opened.

The card enclosure 161 also includes a shutter detect sensor (not shown) for detecting whether the shutter 165 is open or closed.

The card reader 160 also includes a linear transport mechanism (shown generally by arrow 168) for transporting the data card 42 into and out of the card enclosure 161. The linear transport mechanism 168 comprises three pairs of co-operating rollers 170,171,172.

The card enclosure 161 also includes a card read/write head 173 for reading data from the data card 42 and writing data to the data card 42 as necessary. The card enclosure 161 also includes multiple sensors (not shown) for accurately locating the position of the data card 42 within the card enclosure 161.

The SST 150 also includes an SST controller 174, which includes a card guide control circuit 180 implemented as an expansion board that slots into a motherboard (not shown) on which a processor 182 is mounted. The processor 182 executes an SST control program 184.

The SST control program 184 controls the operation of the SST, including communicating with modules such as the card reader 160, and presenting a sequence of screens to a customer to guide the customer through a transaction.

Figure 10:
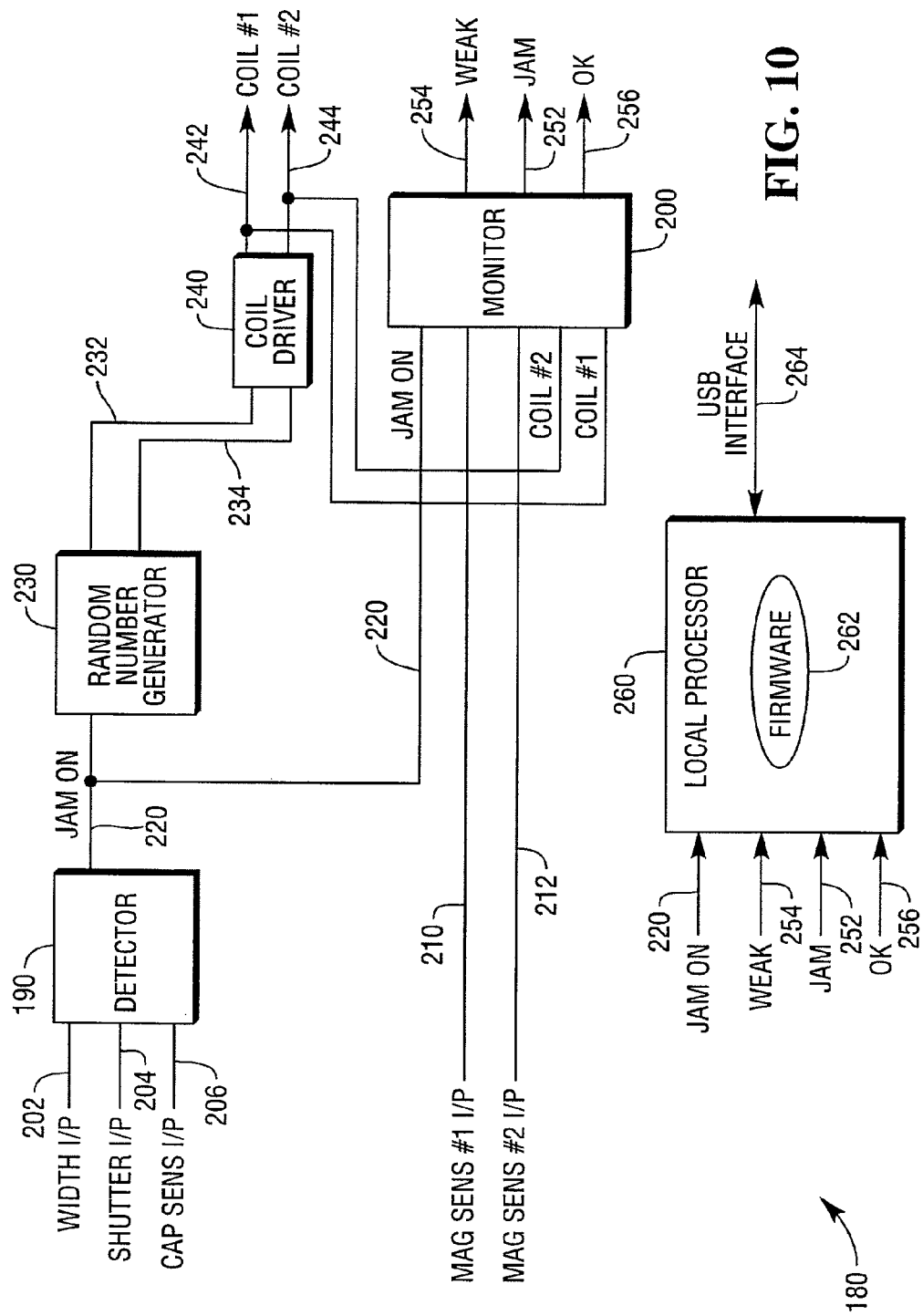
FIG. 10 is a block diagram of a detector controller for controlling the operation of the magnetic reader detector of FIG. 5 and the signal generator of FIG. 7.

Reference will now also be made to FIG. 10, which is a simplified block diagram of the card guide control circuit 180 that is used to control the electronic components in the card reader guide 10 and to indicate if an alien reader may be present.

The control circuit 180 receives five inputs. Three of these inputs are fed into a detector 190, the other two inputs are fed into a monitor 200.

One of the detector inputs (the width switch status) 202 comes from the card reader 160 and indicates the status (open or closed) of the width switch 166 on the card reader 160.

Another of the detector inputs (the shutter status) 204 indicates the status of the shutter 165 in the card reader 160. The shutter 165 can either be open or closed and controls access to the card transport path 163 within the card reader 160. The shutter 165 is only opened by the card reader controller 164 (FIG. 9) within the card reader 160 if the width switch 166 is closed and the magnetic pre-read head 167 detects a magnetic stripe.

The third detector input (from the capacitive sensor 112) 206 indicates the state of the output signal from the capacitive sensor 112. The capacitive sensor input 206 indicates whether an object is present in the vicinity of the magnetic stripe path 68.

The two inputs 210,212 (referred to as magnetic signal inputs) that are fed into the monitor 200 are from the two magnetic sensors 118a,b. These magnetic signal inputs 210, 212 indicate the presence of a magnetic signal at each of the two magnetic sensors 118a,b respectively.

The detector 190 includes logic circuitry (not shown in detail) and provides an active output 220 (referred to as the jam signal) based on the status of the width switch 166 (indicated by the width switch status input 202), the shutter 165 (indicated by the shutter status input 204), and the capacitive sensor input 206, as shown in the table shown in FIG. 11. When the jam signal 220 is active, the control circuit 180 generates a jamming signal, as described in more detail below. This should occur every time a card is inserted by a customer because the inserted card changes the dielectric value of the air gap above the capacitive sensor 112.

The jam signal 220 is fed into a random number generator circuit 230 (which may generate truly random or pseudo random numbers). Random number generating circuits are well-known to those of skill in the art so will not be described herein in detail.

The random number generator circuit 230 provides two outputs: a first random signal 232 and a second random signal 234. These two outputs 232,234 (which convey different random signals) are fed into a coil driver circuit 240.

The coil driver circuit 240 generates two base signals (a first base signal and a second base signal), each centered on approximately 2 kHz. The coil driver circuit 240 applies the first random signal 232 to the first base signal; and the second random signal 234 to the second base signal, and outputs these as a first drive signal 242 and a second drive signal 244 respectively. In this embodiment, the random signals are in the form of a bit pattern sequence. The coil driver circuit 240 uses the random signals (the bit pattern sequences) to change the duty cycle of each of the first and second base signals. That is, the random signals are used to provide pulse width modulation of the 2 kHz signals. The important point is that the random signals 232,234 are used to impart some randomness to the regular (2 kHz) base signals. This randomness may comprise pulse width modulation, amplitude modulation, superimposing a high frequency component on a base signal, or any other convenient technique. This added randomness makes it much more difficult to filter out the signals.

The first drive signal 242 is output to the first inductive coil drive 120a; and the second drive signal 244 is output to the second inductive coil drive 120b. Thus, the first and second drive signals 242,244 are the signals that drive the inductive coil drives 120a,b.

The first and second drive signals 242,244 are also output to the monitor 200. The main purpose of the monitor 200 is to ensure that the magnetic reader detector 30 is not being (i) jammed by an external signal, or (ii) screened so that it does not detect an alien reader. To achieve this purpose, the monitor 200 continually monitors the two magnetic signal inputs 210,212 from the two magnetic sensors 118a,b. As mentioned above, these magnetic signal inputs 210,212 indicate the presence of magnetic signals at the two magnetic sensors 118a,b.

The monitor 200 correlates these two magnetic signal inputs 210,212 with the jam signal 220. Due to time delays in creating an electro-magnetic field at the coil drives 120, there will be a short delay between each of the coil drive signals 242,244 going active, and the two magnetic sensors 118a,b detecting an electro-magnetic field. Hence there will be a delay between the coil drive signals 242,244 going active and the magnetic signal inputs 210,212 going active. Similarly, when the coil drive signals 242,244 go inactive, there will be a short delay before the magnetic signal inputs 210,212 go inactive.

If the monitor 200 detects that a magnetic signal input 210,212 is active at the instant when the associated coil drive signal 242,244 has just transitioned to active, then this may indicate that a third party is attempting to jam the magnetic reader detector 30. This is because there should be a time delay between the coil drive signal 242,244 going active and an electro-magnetic field being detected. If there is no time delay, then the magnetic signal input 210,212 that was detected as active must have been active before the coil drive signal was activated. If such an event occurs on "m" consecutive occasions, then the monitor 200 activates a jam attack output 252. The jam attack output 252 indicates that a magnetic field is present that was not generated by the coil drives 120a,b. In this embodiment, "m" is four, so the jam attack output 252 is activated if this condition occurs on four consecutive occasions.

Similarly, if the monitor 200 detects that a magnetic signal input 210,212 is inactive at the instant when the associated coil drive signal 242,244 has just transitioned to inactive, then this may indicate that a third party is attempting to shield (or screen) the magnetic reader detector 30 from the magnetic field generated by the coil drives 120a,b. This is because there should be a time delay (a time lag) between the coil drive signal 242,244 going inactive and the electro-magnetic field generated by those coil drives 120a,b reducing to zero. If there is no time delay, then the magnetic signal input 210,212 that was detected as inactive must have been inactive before the coil drive signal was inactivated.

If such an event occurs on "n" consecutive occasions, then the monitor 200 activates a weak output 254. The weak attack output 254 indicates that no magnetic field is present even though the coil drives 120a,b are generating (or attempting to generate) a magnetic field. This may indicate that a third party is attempting to shield (or screen) the two inductive coil drives 120a,b to prevent them from jamming an alien reader. In this embodiment, "n" is four, so the weak output 254 is activated if this condition occurs on four consecutive occasions.

If both of the magnetic sensors 118a,b detect magnetic signals that correlate with the first and second drive signals 242,244, then the monitor 200 activates a normal (OK) output 256 to indicate that the correct jamming signals have been detected from the inductive coil drives 120a,b. In other words, if both of the magnetic sensors 118a,b detect magnetic signals that are correctly offset from the first and second drive signals 242,244 respectively, then the monitor 200 activates the normal output 256. In this embodiment, correctly offset means that there is a time delay between each of the magnetic sensors 118a,b and its associated first and second drive signal 242,244 that corresponds to an expected time delay.

The card guide circuit 180 also includes a local processor 260 executing firmware 262. The firmware 262 interfaces with the logic circuitry in the card guide circuit 180, and communicates with the SST control program 184 via a USB interface 264.

The local processor 260 receives the three outputs 252,254, 256 from the monitor 200 and also the jam signal 220, and the firmware 262 decides whether to raise an alarm based on the status of these signals.

The firmware 262 may transmit an alarm signal if the jam signal 220 is active for longer than a predetermined length of time, for example, one minute, or if either of the weak output 254 or the jam attack output 252 is active, or if either of the weak output 254 or the jam attack output 252 is active for longer than a predetermined time (for example, five seconds).

The firmware 262 communicates with the SST control program 184 and provides an alarm signal (which may be active or inactive) thereto over the USB interface 264. This enables the SST control program 184 to take action if the alarm signal is active. The firmware 262 may also include a simple network management protocol (SNMP) agent (not shown) that transmits a trap to a remote management centre (not shown) if the alarm signal is set active by the firmware 262.

Reference will now also be made to FIG. 12, which is a graph 270 illustrating a signal from the magnetic reader detector 30 while a customer's hand is present in the vicinity of the card reader guide 10.

As is shown in FIG. 12, there are two main areas where a signal is positive, namely, where the customer's hand is present at card insertion (region 272) and where the customer's hand is present at card removal (region 274).

At the card insertion zone 272, when the customer's hand approaches the card reader guide 10 to insert the data card 42, the magnetic reader detector 30 generates a rising signal 280; whereas, when the customer's hand leaves the card reader guide 10 after inserting the data card 42, the magnetic reader detector 30 generates a falling signal 282.

At the card removal zone 274, when the customer's hand approaches the card reader guide 10 to remove the data card 42, the magnetic reader detector 30 generates a rising signal 284; whereas, when the customer's hand leaves the card reader guide 10 after removing the data card 42, the magnetic reader detector 30 generates a falling signal 286.

Figure 13A:
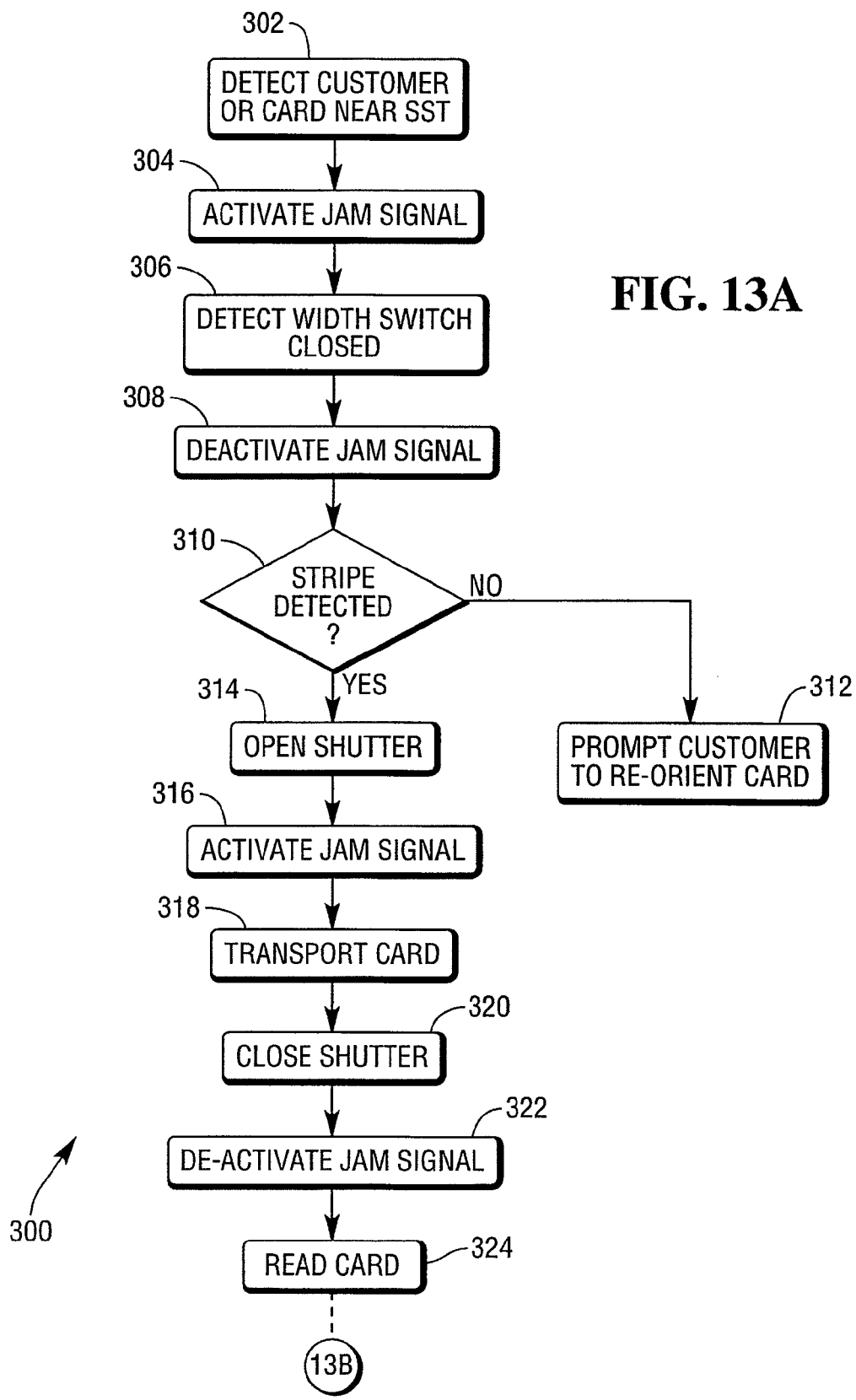
FIG. 13 is a flowchart (split across two sheets) illustrating the operation of the card reader guide of FIG. 1 and the card reader of FIG. 9.
Figure 13B:
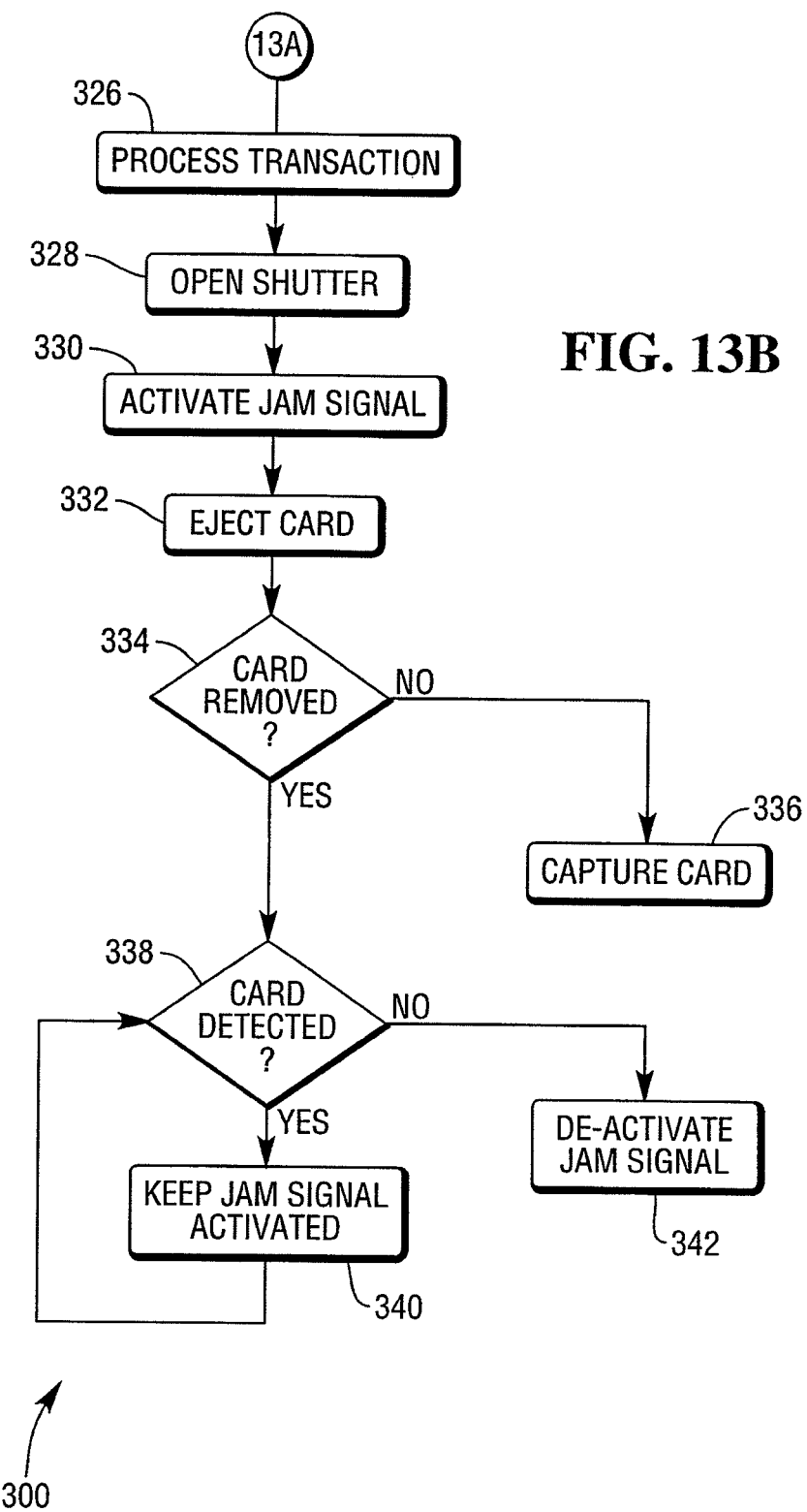

Operation of the card reader guide 10 and the card reader 160 will now be described with reference to a flowchart 300 illustrated in FIG. 13.

Initially, the signal generator 40 is in a de-energized state (that is, no signal is being emitted by the signal generator 40).

When a customer brings the data card 42 near to the SST 150, the proximity detector 30 detects the card 42 and/or the customer's hand (step 302) because of the rising signal 280 (FIG. 12).

At this stage, the shutter 165 is closed and the width switch 166 is open so the jam signal 220 is activated (see FIG. 11) (step 304).

The active jam signal 220 causes the random number generator 230 to generate the first and second random signals 232,234, which the coil driver 240 applies to the first and second base signals to generate the first and second drive signals 242,244, which now have different duty cycles. These signals 242,244 are used to power the inductive coil drives 120a,b respectively, which create magnetic fields around the data card 42. In this embodiment, the random signals 232,234 are continuous bit streams that are applied to the base signals as the base signals are being generated.

The monitor 200 attempts to correlate the two inputs 210, 212 from the two magnetic sensors 118a,b with the first and second drive signals 242,244.

If the signals correlate (that is, the transitions are correct and occur at approximately the correct time delay) then the monitor 200 activates the normal (OK) output 256.

If when the first drive signal 242 goes active, the magnetic signal input 210 is already active, then the monitor 200 records this as a potential jam and increments a counter. If this occurs four times in succession, then the monitor 200 activates the jam attack output 252. If this does not happen four times in succession, for example, on the third occasion the status is correct, then the monitor 200 resets the counter.

Similarly, if when the second drive signal 244 goes inactive, the magnetic signal input 212 is already inactive, then the monitor 200 records this as a potential shielding attack and increments a counter. If this occurs four times in succession, then the monitor 200 activates the weak output 254. If this does not happen four times in succession, for example, on the second occasion the status is correct, then the monitor 200 resets the counter.

In this embodiment, if the jam attack signal 252 or the weak output 254 is active, then the card guide control circuit 180 (specifically, the firmware 262) transmits an alarm to the SST control program 184. This causes the SST control program 184 to return the data card 42 to the customer then to put the SST 150 out of service and send an alarm signal to a remote management centre (not shown) to request a visit from a service engineer.

Returning to flowchart 300, the customer inserts the data card 42 into the card reader guide 10, which closes the width switch 166 (step 306).

When the width switch 166 closes, the detector 190 deactivates the jam signal 220 (step 308) because the shutter 165 is closed (see FIG. 11). This allows the pre-read head 167 to attempt to detect the magnetic stripe 45 on the data card 42 (step 310).

If no magnetic stripe is detected by the pre-read head 167 within a preset time period, then the card reader controller 164 informs the SST control program 184, which presents a screen on the SST display (not shown) informing the customer that the card is incorrectly oriented (step 312). This step 312 is conventional. The customer then removes the card and flips the card round so that it is correctly oriented.

If a magnetic stripe is detect by the pre-read head 167, then the shutter 165 is opened (step 314) and the detector 190 activates the jam signal 220 (step 316).

The card reader 160 then transports the data card 42 inside the card enclosure 161 (step 318). Once the card 42 is inside the card enclosure 161, the shutter 165 is closed (step 320) and the jam signal 220 is de-activated (step 322).

The card reader 160 then reads the data card 42 using the card read/write head 173 (step 324). The transaction then continues as normal, until it is completed (illustrated by step 326).

Once the transaction has been completed, the SST control program 184 instructs the card reader 160 to return the card to the customer. This is implemented by the card reader controller 164 opening the shutter 165 (step 328).

The detector 190 then re-activates the jam signal 220 (step 330) and the data card 42 is transported out of the card reader enclosure 161 for retrieval by the customer (step 332).

The card reader 160 monitors the width switch 166 (and/or the shutter 165) to ascertain when the customer removes the data card 42 (step 334).

If the customer does not remove the card within a preset time period then the card reader 160 captures the customer card by transporting it into the card reader enclosure 161 in a conventional manner (step 336).

If the customer does remove the data card 42, then the SST control program 184 ascertains if the data card 42 is still at or near the SST 150 (that is, if the data card 42 is detected by the proximity detector 30) (step 338).

If the data card 42 is detected by the proximity detector 30, then the jam signal remains active (step 340) until the data card 42 is removed from the vicinity of the SST 150 (or until a predetermined time period elapses).

If the data card 42 is not detected by the proximity detector 30, then the jam signal is de-activated (step 342).

It should now be appreciated that this embodiment has the advantage that a data card is protected from skimming (fraudulent reading) by an alien immediately reader prior to and during insertion into a card reader. Furthermore, by switching off the jamming signal momentarily, it is possible to detect the correct orientation of the data card, without significantly increasing the risk of skimming of the data card.

Various modifications may be made to the above described embodiment within the scope of the invention, for example, in other embodiments, the number of inductive coil drives 120 may be more or less than two. In other embodiments, the inductive coil drives 120 may be driven at a frequency other than 2 kHz.

In other embodiments, the number of times in succession that a correlation must be incorrect before the appropriate signal is activated may be more or less than four, and may differ for the jam attack output and the weak output.

In other embodiments, the control circuit 180 may include a built-in alarm.

In other embodiments the shape of the protrusions may differ from those described above.

In other embodiments, the magnetic reader detector 30 may be located outside the card reader guide; for example, the magnetic reader detector 30 may be mounted directly onto the SST fascia.

In other embodiments, steps 338 to 342 (which involve detecting the card once it has been removed from the SST 150) may not be performed.

The steps of the methods described herein may be carried out in any suitable order, or simultaneously where appropriate.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

What is claimed is:

1. A method of protecting a magnetic card inserted into a card reader in a self-service terminal, the method comprising:
    electromagnetically detecting the card at the card reader;
    energizing an electromagnetic jamming signal transmitter in response to electromagnetically detecting the card;
    detecting a change of state of a width switch;
    de-energizing the electromagnetic jamming signal transmitter in response to detecting the change of state of the width switch;
    detecting a magnetic signal from a magnetic pre-read head located before a magnetic read head of the card reader in an insertion direction; and
    re-energizing the electromagnetic jamming signal transmitter in response to detecting the magnetic signal from the magnetic pre-read head; and wherein energizing and re-energizing of the electromagnetic jamming signal transmitter generates an electromagnetic jamming signal operable to disrupt operation of a card reader separate from and external to the card reader of the self-service terminal.

2. A method according to claim 1, wherein the method comprises the further step of:
    opening a shutter, in response to the magnetic pre-read head detecting a signal, to allow the card to be transported to a card reading chamber.

3. A method according to claim 2, wherein the method comprises the further steps of:
    closing the shutter when the card is within the card reading chamber; and
    de-energizing the electromagnetic signal transmitter in response to the closing.

4. A method according to claim 1, wherein the step of detecting presentation of a card at a card reader comprises detecting a customer's hand while the card is presented.

5. A method according to claim 1, wherein the step of electromagnetically detecting the card at the card reader is implemented using a proximity sensor.

6. A self-service terminal comprising:
    a card reader including (i) a width switch operable to change state when a card is inserted by a customer, and (ii) a magnetic pre-read head located before a magnetic read head of the card reader in an insertion direction; the magnetic pre-read head operable to detect a magnetic stripe on the card;
    a proximity sensor operable to detect a card while the card is presented by the customer;
    an electromagnetic signal transmitter operable, upon energizing, to create an electromagnetic signal for jamming a magnetic reading head separate from and external to the card reader of the self-service terminal; and
    a control program operable to (i) detect a change in state of the width switch, (ii) de-energize the electromagnetic signal transmitter in response to the change in state of the width switch, (iii) open a shutter in response to the magnetic pre-read head detecting the magnetic stripe, and (iv) re-energize the electromagnetic signal transmitter to create the electromagnetic signal for jamming in response to the pre-read head detecting the magnetic stripe.

7. A terminal according to claim 6, wherein the proximity sensor is located within a card reader guide.

8. A terminal according to claim 7, wherein the card reader guide is removably coupled to a fascia of the terminal.

9. A terminal according to claim 6, wherein the proximity sensor is operable to detect both the customer and any alien reader attached to the self-service terminal to read the customer's card.

10. A terminal according to claim 6, wherein the self-service terminal comprises an automated teller machine including a cash dispenser.

11. A self-service terminal comprising a contact sensor, a magnetic pre-read head located before a magnetic read head of the card reader in an insertion direction of a data card into the terminal, an electromagnetic jamming signal transmitter and a controller operable to (i) energize the electromagnetic jamming signal transmitter when the data card approaches the terminal, (ii) de-energize the electromagnetic jamming signal transmitter in response to a change in state of the contact sensor, and (iii) re-energize the electromagnetic jamming signal transmitter in response to detection by the magnetic pre-read head that the data card has been properly inserted, and wherein the energizing generates and the re-energizing regenerates an electromagnetic signal for disrupting a card reader separate from and external to the self-service terminal.

12. A self-service terminal according to claim 11, wherein a shutter is opened in response to the magnetic pre-read head detecting a signal to allow the card to be transported to a card reading chamber.

13. A self-service terminal according to claim 12, wherein the shutter is closed when the data card is within the card reading chamber; and the electromagnetic signal transmitter is de-energized in response to the closing.

14. A self-service terminal according to claim 11, wherein the contact sensor comprises a width switch.

15. A self-service terminal according to claim 11, further comprising a proximity sensor in the self-service terminal to detect card presentation.

16. A self-service terminal according to claim 11, further comprising a randomness generator circuit to vary the jamming signal.

17. A self-service terminal according to claim 16, wherein the randomness generator circuit provides two different drive signals as outputs.

18. A self-service terminal according to claim 11, further comprising a monitor to detect a short delay between energizing the jamming signal and detecting the jamming signal.

19. A self-service terminal according to claim 18, wherein if no delay is detected by the monitor a predetermined number of times, a jam attack output is activated.

20. A self-service terminal according to claim 11, further comprising a monitor to detect inactivity at an instant when the jamming signal has just been de-energized.

* * * * *